Patented Jan. 17, 1950

2,495,137

UNITED STATES PATENT OFFICE 2,495,137

POLYMERIZATION OF BUTADIENE

George P. Rowland, Jr., Pottstown, Pa., assignor to The Firestone Tire & Rubber Company, Akron, Ohio, a corporation of Ohio No Drawing. Application May 5, 1948, Serial No. 25,310

4 Claims. (Cl. 260—94.2)

This invention relates to the preparation of sodium-catalyzed vapor-phase polymers of butadiene, and in particular, to the preparation of such polymers more particularly adapted for chemical conversion as by chlorination, cyclization, etc.

The preparation of polymers by contacting gaseous butadiene with metallic sodium has heretofore been practiced on an experimental scale. While such processes are attractive from a theoretical standpoint, they have certain technical and manipulative disadvantages. Specifically, the provision and support of the sodium catalyst involves certain difficulties; for instance, the sodium is commonly evaporated and condensed as a mirror-coating upon the surfaces in the reaction vessel. This is difficult to carry out on a practical scale.

Moreover the butadiene polymers heretofore prepared have not been satisfactory starting materials for the production of chlorinated products similar to chlorinated natural rubber due, inter alia, to the behavior of the synthetic polymers during the initial stages of chlorination when carbon tetrachloride (the only economic solvent for this purpose) is employed as the chlorination medium.

When natural rubber is chlorinated in carbon tetrachloride solution, there is formed, shortly after the beginning of the chlorination, a gel-like precipitate which redissolves upon further chlorination. When synthetic polymers of butadiene and the like are subjected to chlorination in carbon tetrachloride, a similar phenomenon is observed; however, upon further chlorination the precipitate does not redissolve, see the German patent to Blomer 728,640 p. 1, lines 16–21. When isolated from the reaction mass, this precipitated material is found to be completely insoluble in any known solvents and to be of no economic value.

Accordingly it is an object of this invention to provide a novel and economical method for the production of synthetic butadiene polymers.

Another object is to provide a novel vapor-phase, sodium catalyzed process for the polymerization of butadiene.

A still further object is to provide novel polymers of butadiene, and particularly, to provide such polymers which will be readily adapted to chemical conversion processes, such as chlorination in carbon tetrachloride.

SYNOPSIS OF THE INVENTION

The above and other objects are secured in accordance with this invention, in a process in which a solvent cement of previously prepared polybutadiene, containing dispersed therein finely divided sodium, is coated upon suitable "growing surfaces" (e. g. flat plates, walls, etc.) in a polymerization vessel. Butadiene is introduced into the vessel and polymerizes upon the coated surfaces. When a sufficient depth of polymer has been built up, the supply of butadiene is discontinued, the vessel is opened and the polymer stripped from the surfaces upon which it has formed. The resultant polymer has many excellent properties adapting it for varied technical uses. In particular, and in contrast to butadiene polymers heretofore prepared, the polybutadienes prepared in accordance with this invention may be successfully chlorinated in carbon tetrachloride solution as detailed more particularly hereinbelow.

THE POLYBUTADIENE CEMENT CATALYST

In preparing the "growing surfaces" upon which the butadiene polymerizes, the surfaces are coated with a solvent cement of any polybutadiene (preferably one previously prepared by the process of this invention) having dispersed therein particles of finely comminuted sodium, or "sodium sand." The solvent may be any suitable volatile solvent for the polybutadiene which is not reactive with the sodium, such as solvents on the order of petroleum ether, benzene, or toluene, the nature of the solvents being immaterial since they are removed by evaporation from the foundation layer before the polymerization reaction begins. The concentration of polybutadiene in the solvent is a mere matter of convenience in coating manipulation; in general it will be desired to lay down a catalyst coating from .001" to .01" thick upon the polymerization surfaces in one or more coats. For this purpose, cements containing from 2% to 10% of polybutadiene, based on the weight of cement, will be found suitable.

The size of the sodium particles in the cement employed as the foundation coating in the polymerization apparatus may be varied considerably, for instance from about 20 mesh to about 100 mesh. The amount of sodium sand introduced into the reaction along with the cement has a distinct effect upon the solution viscosity of the product, lesser percentages resulting in products having higher viscosities. In general, with any given size of sodium particles, the final properties of the product may be said to be roughly a unique function of the percentage of sodium catalyst employed on the basis of the weight of the final polybutadiene produced, i. e., the effects, say, of using an inordinately large quantity of sodium in the foundation layer will be offset by the corresponding time required to produce a large amount of polybutadiene to bring the percentage of sodium on the basis of product down to a given value. On this basis, the amount of sodium used may be varied from 0.5% to 10.0%, based on the weight of polybutadiene ultimately produced.

An interesting feature of the process of this invention is the fact that the sodium sand particles appear to migrate with the growing mass of polymerizing butadiene, so that, in the final polymerized product, the sodium will be found to be uniformly dispersed throughout the polymerized mass rather than confined to the original foundation layer.

THE POLYMERIZATION APPARATUS

Various types of apparatus may be employed in the practice of this invention. In general, it is desirable to employ an apparatus providing large surface areas which may be coated with the catalyst cement. Likewise it is desirable to provide an apparatus the polymerizing surfaces of which may be readily coated, and from the polymerizing surfaces of which the polymer may be conveniently stripped. A highly efficient piece of equipment for this purpose consists of an autoclave having suspended therein a series of parallel flat sheet metal plates, suitably mounted on a supporting frame and spaced apart by a distance of 1 to 3 or 4 inches. The autoclave is provided with a door through which the frame and plates may be bodily removed for coating with the catalyst cement (this operation may also be accomplished by flooding the autoclave with the catalyst cement, draining and drying) and for stripping the product polybutadiene from the plates.

THE OPERATION OF THE PROCESS

In the operation of the process, the foundation coating of polybutadiene-sodium sand is coated upon the polymerization surfaces, and dried to remove the solvent. Butadiene is then admitted to the space around the surfaces, whereupon polymerization will begin and will continue as long as butadiene is supplied, up to a maximum of about 6 days. The polymerization may be carried out over a wide range of temperatures; for instance the temperature of the polymerizing surfaces may be maintained over the range from 10° C. to 70° C. The partial pressure of butadiene in the reaction vessel may likewise be varied over a wide range, for instance from 100 mm. of mercury up to the pressure at which butadiene would condense to a liquid at the temperature reigning within the reaction vessel. The presence of oxygen in the reaction vessel is to be avoided; however, the presence of non-reactive gases such as nitrogen and the like have no special effect beyond decreasing the effective concentration of the butadiene.

THE PRODUCT POLYBUTADIENES

The polybutadienes produced in accordance with this invention are generally similar to polybutadienes prepared by other processes, and may be used for the same purposes. They are of especial use, however, as starting materials for chemical conversion processes such as chlorination, isomerization, cyclization etc., since they are of uniform quality (the properties may be reproducibly adjusted, for various particular applications, by adjusting the amount and particle size of the sodium introduced with the catalyst cement) are readily soluble, and contain no complex catalyst residues. Particularly for chlorination, the polybutadienes of this invention are admirably adapted, and a suitable process will now be described.

CHLORINATION OF THE PRODUCT POLYBUTADIENES

The polybutadienes of this invention are distinguished by the fact that they may be successfully chlorinated in carbon tetrachloride solution by a special process which will now be detailed.

The polybutadiene is dissolved in carbon tetrachloride and then contacted, at room temperature, with chlorine diluted with at least an equal volume of nitrogen or other inert gas, the mass being vigorously agitated throughout this and all subsequent steps. A precipitate shortly forms, which however is workable and further chlorinatable in contrast to similar precipitates obtained with other polybutadienes in comparable processes, which are gummy, unworkable and not further chlorinatable. When the precipitation is complete, introduction of chlorine is continued, with or without dilution by the inert gas, until the precipitate ceases to take up further quantities of chlorine.

More energetic chlorination conditions are now applied, and may comprise either (1) raising the temperature to about 100° C., with an appropriate application of pressure to maintain the carbon tetrachloride in liquid phase, and introduction of further quantities of chlorine or (2) introducing further quantities of chlorine while subjecting the mass to mercury vapor irradiation supplied at a rate equivalent to the total output of a mercury vapor lamp or lamps drawing 20 watts per gram of polybutadiene being processed. Under these conditions the precipitate takes up further quantities of chlorine and redissolves in the carbon tetrachloride. The ultimate chlorinated product isolated from the solvent contains about 66–68% chlorine and is suitable for all of the uses for which chlorinated natural rubber is employed.

CAUTIONARY NOTE

Sodium in contact with carbon tetrachloride may be explosively detonated, and some hazard might be anticipated from the introduction of sodium rubber into carbon tetrachloride. This phenomenon has not been observed in the practice of the present invention. However, if it is desired to preclude all risk, the polymers may be worked on the wash mill to destroy the sodium.

With the foregoing general discussion in mind, there are given herewith detailed specific examples of the practice of this invention. All parts given are by weight.

EXAMPLE

A. *Preparation of special polybutadiene*

CATALYST CEMENT

| | |
|---|---|
| Benzene | 1200 parts |
| Polybutadiene (usually from previous similar runs) | 100 parts |
| Sodium sand | 1–7.5% (per table) (on the basis of the final polymer) |

The sodium sand was prepared by agitating melted metallic sodium with xylene. When the mixture became light tan, the agitation was discontinued and the mixture allowed to cool. The resultant sodium sand varies in size from 20–80 mesh, averaging 60 mesh. The sodium sand was washed by repeated decantation with dry benzene. For special runs to determine the effect of different sizes of particles, the sand was classified by screening under dried benzene.

A series of polymers was prepared, using various proportions of sodium sand, and operating at various temperatures, as set forth in the table. In each run, a cement was made up from the ingredients set forth in the above schedule with the selected amount of sodium sand and was coated and dried upon a series of steel plates about one foot square which were hung parallel and 1½" apart in an autoclave. The autoclave was flushed with nitrogen and then evacuated. The temperature was adjusted to the value selected for the run and maintained at this value throughout the reaction to follow. Butadiene was then admitted to the autoclave and permitted to build up to a pressure of 30 pounds per square inch gauge which was gradually decreased to substantially zero gauge pressure over a period of 48 hours, at the end of which time the unpolymerized butadiene was vented, the autoclave purged with inert gas and opened up. The polymerization plates had a layer of polybutadiene about ½" thick thereon, which layer was stripped off and employed in the chlorination step detailed hereinafter.

RESTRAINED CHLORINATION STEP

Carbon tetrachloride _____ 100 parts
Polybutadiene (prepared as described above, per table) _____ 1, 2 or 3 parts (per table)
Mixed Chlorine _____ 1 volume
Mixed Nitrogen _____ 1, 2, 5, or 8 volumes (per table)

A series of chlorination runs were made, using as starting materials various polybutadienes prepared as above described. In each case a cement was made from the selected polybutadiene and carbon tetrachloride and introduced into a closed reaction vessel provided with an anchor stirrer, a gas diffuser at the bottom and a reflux condenser venting to a waste gas stack at the top. The reaction vessel was also provided with a mercury vapor lamp arranged to illuminate the contents of the vessel. This lamp was not energized during the early stages of the reaction. The chlorine and nitrogen mixture was introduced into the cement through the diffuser and almost immediately a gel phase appeared in the reaction mass. This precipitated gel, although fairly thick, was not coherent and remained tractable and workable. As soon as no further amounts of gel appeared to be formed, pure chlorine was introduced through the diffuser and introduction continued until the reaction mass refused to take up further quantities of chlorine spontaneously.

At this point the partially chlorinated mass was divided into two parts, and one part was left in the vessel and chlorinated with ultra-violet light as will now be described, and the other part was removed to another vessel and chlorinated with heat and pressure as will be described hereinbelow.

ULTRA-VIOLET FINAL CHLORINATION

The mercury vapor ultra-violet light was turned on (the lamp is regulated to draw 20 watts per gram of polybutadiene in the vessel) and introduction of chlorine and agitation continued for a further 7 hours. During this time the gel underwent further chlorination and redissolved slowly in the carbon tetrachloride, ultimately yielding an entirely homogeneous solution. This solution was then injected into a boiling water bath which flashed off the carbon tetrachloride, leaving the chlorinated product in spongy precipitated form. The product contained approximately 66% chlorine, indicating substantially complete chlorination, and was substantially identical in properties to chlorinated natural rubber.

HIGH PRESSURE CHLORINATION

The portion of the partially chlorinated mass destined for high temperature chlorination was placed in an autoclave rated to withstand 10 atmospheres pressure and provided with internal agitating means and with a steam jacket. The autoclave was closed off, agitation was commenced, and steam was admitted to the jacket to raise the temperature of the mass to 100° C. selected for the run. Sufficient pressure was applied to maintain the carbon tetrachloride in the liquid phase, and chlorine was injected until the precipitate redissolved and the chlorine content of the dissolved product increased to about 66%. The resultant solution was injected into boiling water which flashed off the carbon tetrachloride, leaving the chlorinated product in spongy precipitated form. The product was substantially identical in properties to chlorinated natural rubber.

Particulars of the several polymerization runs, and of the chlorination procedures, together with the properties of the polybutadienes and chlorinated polybutadienes produced thereby, are set forth herewith in the table.

Table

| Polymerization of Butadiene | | | | Properties of Polybutadiene Chlorinated in Final Stage With— | | | | Run No. |
|---|---|---|---|---|---|---|---|---|
| Na Catalyst | | Temp., °C. | Viscosity of Polybutadiene, C. P. S.[1] | Ultra-violet light | | At 100° C. under pressure | | |
| Size (mesh No.) | Amount (per cent, basis of weight of polybutadiene produced) | | | Viscosity, C. P. S.[1] | Chlorine Content, Per cent | Viscosity, C. P. S.[1] | Chlorine Content, Per cent | |
| 20 | 3.9 | 25 | 18.2 | 70 | 66.0 | 63 | 66.5 | 1 |
| 40 | 3.7 | 25 | 12.3 | 68 | 66.3 | 70 | 66.0 | 2 |
| | 1.1 | 25 | 28.0 | 110 | 66.8 | 90 | 66.5 | 3 |
| | 1.9 | 25 | 20.0 | 93 | 66.3 | 95 | 66.0 | 4 |
| 60 | 2.8 | 25 | 14.0 | 65 | 65.5 | 52 | 66.8 | 5 |
| | 3.7 | 25 | 10.1 | 34 | 66.0 | 25 | 66.5 | 6 |
| | 5.2 | 25 | 9.0 | 20 | 67.0 | 27 | 66.5 | 7 |
| | 8.0 | 25 | 7.0 | 17 | 66.8 | 15 | 67.0 | 8 |
| 80 | 3.7 | 25 | 7.2 | 18 | 67.5 | 15 | 66.8 | 9 |
| | 4.5 | 10 | 40.0 | 376 | 65.3 | 250 | 66.3 | 10 |
| mixed[2] | 5.0 | 25 | 16 | [3]58 | [3]67.6 | [3]95 | [3]66.0 | 11 |
| | 4.8 | 50 | 8.5 | 25 | 66.3 | 18 | 66.9 | 12 |

[1] Viscosity, in centipoises, of a 2.5% solution, in ethylene dichloride at 25° C.
[2] Mixed sizes of Na particles, ranging from 20 to 80 mesh, taken without selection by screening from the original suspension in benzene.
[3] Four volumes of $N_2$ per volume of $Cl_2$ were employed in this run.

From the foregoing general discussion and detailed specific example, it will be evident that this invention provides a novel and highly practical method for the preparation of sodium polymerized polybutadienes, which method avoids many of the difficulties in preparing the sodium catalyst surfaces to which older processes are subject. The process makes use of relatively simple equipment, and operates reproducibly to yield products of desirable characteristics. The butadiene polymers produced are admirably adapted for chemical conversion and are particularly distinguished over prior processes in that they may be chlorinated by special processes in carbon tetrachloride solution to yield useful products substantially duplicating the properties of chlorinated natural rubber.

What is claimed is:

1. Process of polymerizing butadiene which comprises coating a surface with a solvent cement of a previously formed polymer of butadiene having suspended therein finely divided sodium said sodium being employed in an amount from 0.5% to 10.0% of the weight of the polybutadiene ultimately produced, evaporating the solvent from the cement to leave a coating of polybutadiene having the finely divided sodium suspended therein, and contacting said coating with gaseous butadiene whereby to polymerize the butadiene upon said surface.

2. Process of polymerizing butadiene which comprises coating a surface with a solvent cement of a previously formed polymer of butadiene having suspended therein finely divided sodium having a grain size from 20 mesh to 100 mesh said sodium being employed in an amount from 0.5% to 10.0% of polybutadiene ultimately produced, evaporating the solvent from the cement to leave a coating of polybutadiene having the finely divided sodium suspended therein, and contacting said coating with gaseous butadiene whereby to polymerize the butadiene upon said surface.

3. Process of polymerizing butadiene which comprises coating a surface with a solvent cement of a previously formed polymer of butadiene having suspended therein finely divided sodium said sodium being employed in an amount from 0.5% to 10.0% of the weight of the polybutadiene ultimately produced, evaporating the solvent from the cement to leave a coating of polybutadiene having the finely divided sodium suspended therein, and contacting said coating with gaseous butadiene at temperatures from 10° C. to 70° C. and at pressures from 100 mm. of mercury up to the condensation pressure of butadiene at the prevailing temperature.

4. Process of polymerizing butadiene which comprises coating a surface with a solvent cement of a previously formed polymer of butadiene having suspended therein finely divided sodium having a grain size from 20 mesh to 100 mesh said sodium being employed in an amount from 0.5% to 10.0% of polybutadiene ultimately produced, evaporating the solvent from the cement to leave a coating of polybutadiene having the finely divided sodium suspended therein, and contacting said coating with gaseous butadiene at temperatures from 10° C. to 70° C. and at pressures from 100 mm. of mercury up to the condensation pressure of butadiene at the prevailing temperature.

GEORGE P. ROWLAND, Jr.

REFERENCES CITED

The following references are of record in the file of this patent:

UNITED STATES PATENTS

| Number | Name | Date |
|---|---|---|
| 1,192,310 | Holt | July 25, 1916 |
| 1,934,123 | Hofman et al. | Nov. 7, 1933 |
| 2,431,315 | Drummond | Nov. 25, 1947 |

FOREIGN PATENTS

| Number | Country | Date |
|---|---|---|
| 307,308 | Great Britain | June 4, 1930 |

OTHER REFERENCES

Talalay and Magat: "Synthetic Rubber from Alcohol," Interscience Publishers, Inc., New York, 1945.